US010752122B2

(12) United States Patent
Werner et al.

(10) Patent No.: US 10,752,122 B2
(45) Date of Patent: Aug. 25, 2020

(54) MOTORCYCLE WITH AN ELECTRICALLY DRIVEABLE FRONT WHEEL

(71) Applicant: Bayerische Motoren Werke Aktiengesellschaft, Munich (DE)

(72) Inventors: Ernst August Werner, Aachen (DE); Gerhard Mueller, Paehl (DE); Franz Garnweitner, Neufahrn (DE); Werner Weck, Munich (DE); Gerhard Reiner, Paehl (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 189 days.

(21) Appl. No.: 15/868,485

(22) Filed: Jan. 11, 2018

(65) Prior Publication Data
US 2018/0134339 A1    May 17, 2018

Related U.S. Application Data

(63) Continuation of application No. PCT/EP2016/064986, filed on Jun. 28, 2016.

(30) Foreign Application Priority Data

Sep. 4, 2015    (DE) .......................... 10 2015 216 949

(51) Int. Cl.
*B60L 50/60* (2019.01)
*B62M 23/02* (2010.01)
(Continued)

(52) U.S. Cl.
CPC .............. *B60L 50/60* (2019.02); *B62M 6/00* (2013.01); *B62M 6/60* (2013.01); *B62M 6/65* (2013.01);
(Continued)

(58) Field of Classification Search
None
See application file for complete search history.

(56) References Cited

U.S. PATENT DOCUMENTS 4,346,777 A * 8/1982 Restelli .................. H02K 15/03
180/220
5,560,442 A * 10/1996 Canderle .............. B60K 7/0007
180/221
(Continued)

FOREIGN PATENT DOCUMENTS

CN          104002669 A    8/2014
DE            412094      4/1925
(Continued)

OTHER PUBLICATIONS

International Search Report (PCT/ISA/210) issued in PCT Application No. PCT/EP2016/064986 dated Oct. 7, 2016 with English translation (six pages).
(Continued)

*Primary Examiner* — Joseph M Rocca
*Assistant Examiner* — Harold Eric Pahlck, III
(74) *Attorney, Agent, or Firm* — Crowell & Moring LLP

(57) ABSTRACT

A vehicle with a front wheel and a front wheel of a vehicle is provided. The front wheel is drivable by a first drive arrangement, and a rear wheel of the vehicle is drivable by a second drive arrangement. The first drive arrangement may be integrated into the front wheel, and includes an electric motor for selectively rotatably driving the front wheel, a reduction gear between the electric motor and the front wheel, and an actuable coupling for selectively coupling or decoupling the electric motor to the reduction gear.

17 Claims, 2 Drawing Sheets

(51) Int. Cl.
*B62M 6/00* (2010.01)
*B62M 6/65* (2010.01)
*B62M 6/60* (2010.01)
*B62M 7/00* (2010.01)
*B62M 7/12* (2006.01)
*B62M 11/18* (2006.01)
*B62M 25/08* (2006.01)
*B62J 45/40* (2020.01)

(52) U.S. Cl.
CPC ............... *B62M 7/00* (2013.01); *B62M 7/12* (2013.01); *B62M 11/18* (2013.01); *B62M 23/02* (2013.01); *B62M 25/08* (2013.01); *B60L 2200/12* (2013.01); *B60L 2220/14* (2013.01); *B60L 2220/44* (2013.01); *B62J 45/40* (2020.02)

(56) References Cited

U.S. PATENT DOCUMENTS

| | | | | |
|---|---|---|---|---|
| 5,600,191 | A * | 2/1997 | Yang | H02K 7/10 310/67 R |
| 8,245,804 | B2 * | 8/2012 | van Rooij | B62M 6/65 180/65.51 |
| 8,413,748 | B2 * | 4/2013 | Nishikawa | B62M 6/65 180/65.51 |
| 8,449,421 | B2 * | 5/2013 | Jung | B62M 6/65 475/12 |
| 8,702,549 | B2 * | 4/2014 | Yoshino | B60K 7/0007 475/149 |
| 9,199,526 | B2 * | 12/2015 | Hasuda | B60L 15/20 |
| 9,315,232 | B2 * | 4/2016 | Bang | B62M 11/14 |
| 10,279,859 | B2 * | 5/2019 | Eguchi | B62K 11/02 |
| 2007/0257570 | A1 | 11/2007 | Walter et al. | |
| 2010/0089671 | A1 | 4/2010 | Trunkenpolz | |
| 2011/0036656 | A1 * | 2/2011 | Nicoson | B62M 23/00 180/220 |
| 2012/0065825 | A1 * | 3/2012 | Nicoson | B62K 11/04 701/22 |
| 2012/0080252 | A1 * | 4/2012 | Nishimori | B62M 6/65 180/65.51 |
| 2012/0169154 | A1 * | 7/2012 | Curodeau | B60L 50/20 310/43 |
| 2012/0309578 | A1 * | 12/2012 | Solka | F16H 37/041 475/149 |
| 2014/0125205 | A1 * | 5/2014 | Landfors | B60K 7/0007 310/67 R |
| 2014/0238766 | A1 | 8/2014 | Hasuda et al. | |
| 2017/0085149 | A1 * | 3/2017 | Osterlaenger | H02K 5/20 |

FOREIGN PATENT DOCUMENTS

| | | |
|---|---|---|
| DE | 94 20 303 U1 | 2/1995 |
| DE | 100 56 597 A1 | 5/2002 |
| DE | 103 38 659 A1 | 3/2005 |
| DE | 10 2007 006 167 A1 | 8/2008 |
| EP | 0 598 802 B1 | 6/1996 |
| KR | 10-2015-0009320 A | 1/2015 |
| WO | WO 93/03956 A1 | 3/1993 |

OTHER PUBLICATIONS

German-language Written Opinion (PCT/ISA/237) issued in PCT Application No. PCT/EP2016/064986 dated Oct. 7, 2016 (five pages).

German-language Search Report issued in counterpart German Application No. 10 2015 216 949.9 dated Jun. 10, 2016 with partial English translation (13 pages).

English Translation of Chinese-language Office Action issued in counterpart Chinese Application No. 201680029818.3 dated Apr. 2, 2019 (10 pages).

Chinese-language Office Action issued in counterpart Chinese Application No. 201680029818.3 dated Sep. 6, 2019 with English translation (15 pages).

Chinese-language Office Action issued in Chinese Application No. 201680029818.3 dated Feb. 21, 2020 with English translation (10 pages).

* cited by examiner

MOTORCYCLE WITH AN ELECTRICALLY DRIVEABLE FRONT WHEEL

CROSS REFERENCE TO RELATED APPLICATIONS

This application is a continuation of PCT International Application No. PCT/EP2016/064986, filed Jun. 28, 2016, which claims priority under 35 U.S.C. § 119 from German Patent Application No. 10 2015 216 949.9, filed Sep. 4, 2015, the entire disclosures of which are herein expressly incorporated by reference.

BACKGROUND AND SUMMARY OF THE INVENTION

The invention concerns vehicles with a front wheel which can be driven by a first drive arrangement and a rear wheel which can be driven by a second drive arrangement.

Examples of such vehicles include motorcycles having a supplemental electric drive for the front wheel. In these vehicles, the corresponding electric motor is integrated within the front wheel. In addition, a reduction gear may be incorporated between the electric motor and the front wheel which is to be driven.

A corresponding vehicle is described for example in DE 10 2007 006 167 A1, where the electric drive of the front wheel is supposed to support a regular rear wheel drive in normal driving operation and enhance an off-road capability of the vehicle.

In particular, touring motorcycles have a greater overall weight on account of additional elements, such as luggage systems, additional tanks, or complicated paneling elements. This requires a large expenditure of effort and a secure grip of the rider especially during slow movements or maneuvering of the vehicle. The same also applies to other, non-touring motorcycles, as well as other two, three, or four-wheeled motorcycle-like vehicles, such as scooters, quads or trikes.

The problem which the invention proposes to solve is therefore to facilitate the handling of these vehicles and create a secure and user-friendly supporting system.

Accordingly, a vehicle is proposed with a front wheel which can be driven by a first drive arrangement and a rear wheel which can be driven by a second drive arrangement, wherein the first drive arrangement is integrated in the front wheel and
  comprises an electric motor for selectively rotatably driving the front wheel, and
  comprises a reduction gear which is inserted between the electric motor and the front wheel which is to be driven.

In addition, the first drive arrangement moreover comprises an actuable coupling for selectively coupling or decoupling the electric motor to the reduction gear.

This embodiment of the first drive arrangement makes it possible to arrange the entire first drive arrangement including its mentioned components within a space defined by the front wheel and thereby integrate it in the front wheel. According to a preferred embodiment, the components may be provided for example in the hub region of the front wheel, while the hub region may be designed so that this forms a housing encompassing the first drive arrangement, including its components.

The described arrangement of a coupling makes it possible to couple the electric motor (at least its output end) to the reduction gear when necessary, in order to drive the front wheel. On the other hand, the electric motor may be decoupled from the reduction gear by the coupling when no electric driving of the front wheel is desired. This decoupling occurs mechanically and prevents the electric motor in its inactive state, during an exclusive driving of the vehicle by the second drive arrangement, from likewise being placed in rotary movement and acting as a generator. Thus, a braking action by induction effects is effectively prevented.

The electric motor may thus be specifically coupled and decoupled when a driving of the front wheel is desired. This may be the case, for example, for the maneuvering of the vehicle. But in order to prevent incorrect actuation and enable the easiest possible maneuvering, it may optionally be provided that the second drive arrangement assigned to the rear wheel, which drive arrangement constitutes the actual main drive of the vehicle, is disconnected or at least decoupled from the rear wheel. Instead, the electric motor coupled to the front wheel takes over the sole driving of the vehicle by driving the front wheel.

Depending on the direction of turning of the electric motor (in the coupled state), basically a forward or backward movement of the vehicle is possible. However, a configuration of the reduction gear which will be described in detail below can operate in limiting fashion if it only allows a single direction of turning. In this case, the first drive arrangement is designed preferably for the backward movement of the vehicle.

Furthermore, the coupling may be a mechanical coupling, especially a friction coupling or a claw coupling. The mechanically actuable coupling may be actuated by an electrically actuable servomotor directly or only indirectly, for example, by an intervening kinematics or an intervening Bowden cable. Alternatively, it is likewise possible to design the mechanical coupling such that it may be actuated manually by the rider using a Bowden cable. For both the manual and the electrical actuation it is possible to provide a corresponding switch or pushbutton on the handlebars for operation by the rider.

According to one preferred embodiment, a stator of the electric motor is connected to a front wheel suspension in rotationally firm manner and an output end of the reduction gear is connected to the rotatable front wheel (relative to the front wheel suspension) in rotationally firm manner. The rotationally firm connection of the stator to the front wheel suspension should be understood as being either a direct and immediate connection or an indirect and rotationally firm connection via additional intervening elements, such as an engine housing, structural elements, and/or a likewise rotationally firm wheel axle.

For example, if the electric motor is designed as an internal rotor, hollow shaft motor, then the stator is likewise connected in rotationally firm manner to the front wheel suspension of the vehicle, whereas the rotor as an internal rotor is rotationally arranged inside the stator, which encloses the rotor in the circumferential direction.

The vehicle may furthermore comprise a control unit, which is designed to control and/or regulate the first drive arrangement, especially the electric motor, and/or to actuate the coupling. This means that for example a rotary speed of the electric motor can be controlled/regulated by the control unit. Alternatively or additionally, the control unit may be operatively coupled to the coupling in order to control its actuation. For this, the control unit may for example correspondingly actuate the described electrically actuable servomotor for the electrical actuation of the coupling, if such is provided.

According to another embodiment, the control unit is comprised in the first drive arrangement and integrated in the front wheel. This means that the control unit is arranged inside the front wheel, preferably likewise in the hub region.

As already indicated, the possibility exists to design the front wheel such that it forms a housing receiving the first drive arrangement and its components within it. This has the benefit that all essential components needed for the driving of the front wheel, and optionally also the control unit, are combined and integrated in the front wheel. The front wheel thus constitutes a self-standing module, which only requires a power supply connection for the supplying of energy to the electric motor as well as an optional connection to a BUS system of the vehicle. The control unit may optionally be designed in disk shape and thus be positioned in an especially space-saving manner inside the housing.

According to another embodiment, it is possible to couple the control unit to a BUS system of the vehicle, especially a CAN bus, at least for the retrieval of information, especially information about the states of the vehicle. This connection allows the control unit to retrieve information from the BUS system of the vehicle and subsequently process it.

Furthermore, the control unit may be designed such that a controlling/regulating of the electric motor and/or an actuation of the coupling occurs in dependence on the retrieved information. Thus, for example, information on the states of the vehicle may be retrieved and corresponding control steps for the electric motor and/or the coupling may occur in response to the particular information.

With the help of the retrieved information, a securement can be electronically achieved in order to prevent an unintentional activation of the first drive arrangement. In this way, the activation can be made dependent on the presence of previously defined parameters and/or parameter values which are provided by means of the information retrieved via the BUS system. If the defined preconditions are not present, an activation of the first drive arrangement will be prevented by the control unit.

According to one sample embodiment, the control unit can be configured so that the coupling of the first drive arrangement is only possible in the event that the second drive arrangement is not in an active operating state. This means that the second drive arrangement assigned to the rear wheel cannot actively drive the vehicle in this case. Otherwise, the actuation of the coupling or the servo motor for activating the coupling (if present) will be blocked. The information about the current operating state of the second drive arrangement is ideally obtained by the control unit through the BUS system.

In other words, therefore, the electric motor should be decoupled and remain so for safety reasons, especially during a forward driving in normal operation of the vehicle, when the drive occurs by the second drive arrangement. An "entrainment" of the electric motor in the normal operation of the vehicle as well as a resulting "generator operation" with corresponding brake effect and induced high voltages is prevented.

In this way, it can be ensured that the normal driving operation of the vehicle is not negatively influenced by the first drive arrangement. Thanks to the decoupling, no torques or braking power act on the front wheel. As a standard feature, the first drive arrangement may be designed such that the electric motor is always decoupled in the active operating state of the second drive arrangement or also when the vehicle is at rest.

According to another exemplary embodiment, the control unit may be configured so that the actuation of the electric motor or of the coupling may only occur if the ignition of the vehicle is turned on and at the same time the second drive arrangement is inactive or at least decoupled. The information about the state of the second drive arrangement then comes, for example, via the BUS system.

For all of the mentioned examples, other parameters or information may also be evaluated, of course, and used to prevent a simultaneous driving of the vehicle by the first and the second drive arrangement.

Furthermore, the first drive arrangement may optionally comprise securing means which are designed to mechanically prevent an unintentional coupling of the electric motor to the reduction gear, especially during an active operating state of the second drive arrangement. In this way, alternatively or in addition to the described electronic securement, an incorrect operation of the first drive arrangement is also precluded in a mechanical manner, which incorrect operation might otherwise result in damage to the vehicle.

This is accomplished, for example, by a mechanical securement, which prevents a coupling of the coupling in a secured state. Mechanically engaging toothing/locking elements and/or spring-loaded blocking elements are especially suitable for this, which block a coupling movement of the coupling and need to be released before the electric motor is actuated. Alternatively or additionally, the coupling itself may be spring-loaded in design, so that a coupling must always be done against the spring force, in order to prevent unintentional closure of the coupling.

According to another embodiment, the reduction gear is a single or multiple-stage planetary gear, especially a two-stage planetary gear, especially preferably a Wolfrom gear. Such gears make it possible to provide especially large reduction ratios, especially in the case of multiple-stage planetary gears. An especially preferred embodiment is the so-called Wolfrom gear, which is a special instance of the two-stage planetary gear with two-stage planet wheels.

For purposes of a maneuvering operation, especially suitable reduction ratios for all mentioned planetary gears are at least 10:1 or higher, preferably at least 100:1 or higher. This means that the input rotary speed is at least 10 times, preferably at least 100 times greater than the output rotary speed of the particular planetary gear.

But as alternative reduction gears it is also possible to use so-called harmonic drive gears, eccentric gears (so-called cyclo gears) or axially parallel offset gears, especially with spur gear stages, worm gears and/or crown gears. Optionally, these will have one of the aforementioned reduction ratios for the maneuvering operation.

In any case, the high reduction ratio which can be achieved makes it possible to design the electric motor to run fast and with low torque. Accordingly, the structural space required is extremely compact, the weight is low, and the power uptake is likewise very low. Another benefit of such an arrangement is the particular aptitude for an especially controlled and slow driving, which is especially suitable for the maneuvering of the vehicle.

For the supply of electric energy, the first drive arrangement can be coupled to a battery of the vehicle. Accordingly, it is possible to use a vehicle battery already present in the vehicle for the power supply. This is usually a 12 volt vehicle battery, but of course other vehicle batteries with a different operating voltage can be used. Optionally, the battery may additionally be designed with an increased capacity, in order to make possible an occasional operation of the first drive arrangement. Alternatively or additionally, the vehicle may have an additional (second) battery which is designed and provided for the operation of the first drive arrangement.

As indicated above, the first drive arrangement according to a further embodiment may be designed for slow maneuvering operation of the vehicle in the forward and/or backward direction, especially for a maneuvering speed between 0 and 5 km/h, preferably between 0 and 2 km/h. This means that the first drive arrangement is not designed for the actual movement of the vehicle over large distances (normal operation). Instead, the first drive arrangement is provided for handling at low speeds, preferably walking speed, and accordingly for short distances, such as usually occur during maneuvering. Accordingly, the electric motor and the selected reduction gear should be designed with a suitable reduction ratio.

Moreover, the electric motor may preferably have a torque between 0.1 and 50 Nm, especially between 0.5 and 10 Nm. Such a motor can be constructed with especially slight space requirement yet even so, thanks to a properly designed reduction gear, it can provide a torque between 150 and 200 Nm on the front wheel sufficient for the intended handling of the vehicle, which is also sufficient to climb small inclines (up to 7%, for example).

According to one preferred embodiment, the vehicle is a motorcycle or a motorcycle-like single-track or two-track vehicle, with two, three or four wheels, especially a, scooter, quad, trike, or similar vehicle. An appropriately designed vehicle, thanks to the invention, can still be maneuvered easily and with no major exertion by the rider, especially in backward movement, even in the case of slight inclines and/or heavy weight, such as for example in the case of touring motorcycles, vehicles with heavy and bulky paneling and/or large fuel tanks.

Furthermore, the first drive arrangement may comprise an electric motor designed as a permanently excited synchronous motor, and/or the second drive arrangement may comprise an electric motor or an internal combustion engine.

Furthermore, a front wheel is proposed for installation in a vehicle according to the present specification, with a first drive arrangement which is integrated in the front wheel and which comprises an electric motor for selectively rotatably driving the front wheel, and comprises a reduction gear which is inserted between the electric motor and the front wheel which is to be driven.

The first drive arrangement moreover comprises an actuable coupling for selectively coupling or decoupling the electric motor to the reduction gear.

Accordingly, the individual components may be designed according to the specification given.

Such a front wheel constitutes a self-standing module, which for example can be mounted and retrofitted on existing vehicles without requiring major adaptations. It is only needed to provide a supply of electric energy to the electric motor. Depending on the arrangement of the control unit, this is to be provided and should make contact in the vehicle; otherwise, it may be integrated inside the front wheel, for example.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
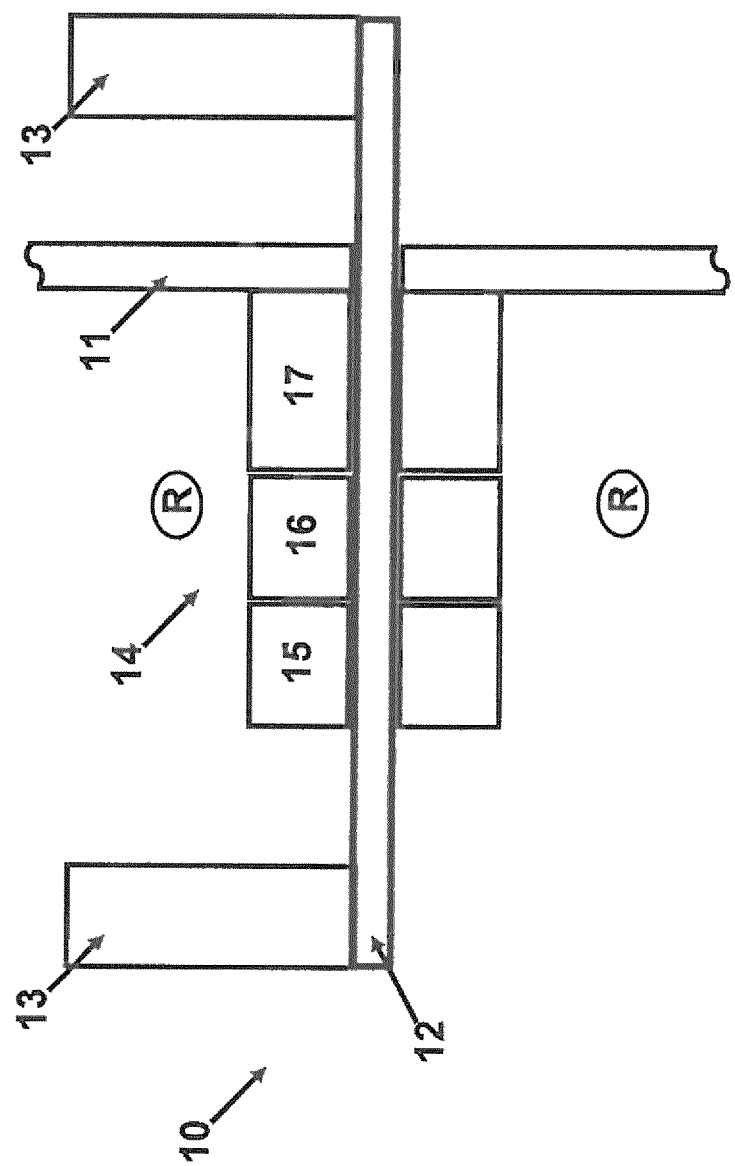
FIG. 1 is a schematic representation of a basic layout of a front wheel arrangement according to an embodiment of the present invention.

FIG. 1 shows in merely schematic representation a portion of a basic layout of a front wheel arrangement 10 for a motorcycle or a motorcycle-like single-track or two-track vehicle (not shown) according to the specification. The front wheel arrangement 10 comprises a front wheel 11, which is designed to rotate about a wheel axle 12. The front wheel 11 is only partly represented and comprises a number of radially extending spokes or a radially extending wheel disk. The wheel axle 12 is connected in rotationally firm manner to the front wheel suspension 13 of the vehicle, which front wheel suspension is designed as a fork. The front wheel 11 can be driven by a first drive arrangement 14, which is arranged for this purpose in the hub region of the front wheel 11 inside a space R defined and bounded by the front wheel 11, and is thus intergrated in the front wheel 11. Furthermore, the first drive arrangement 14 comprises the following components: an electric motor 15 and a reduction gear 17 inserted between the electric motor 15 and the front wheel 11 which is to be driven, in order to selectively drive the front wheel 11.

In addition, the first drive arrangement 14 comprises an actuable coupling 16 for the selective coupling or decoupling of the electric motor 15 to the reduction gear 17.

Figure 2:
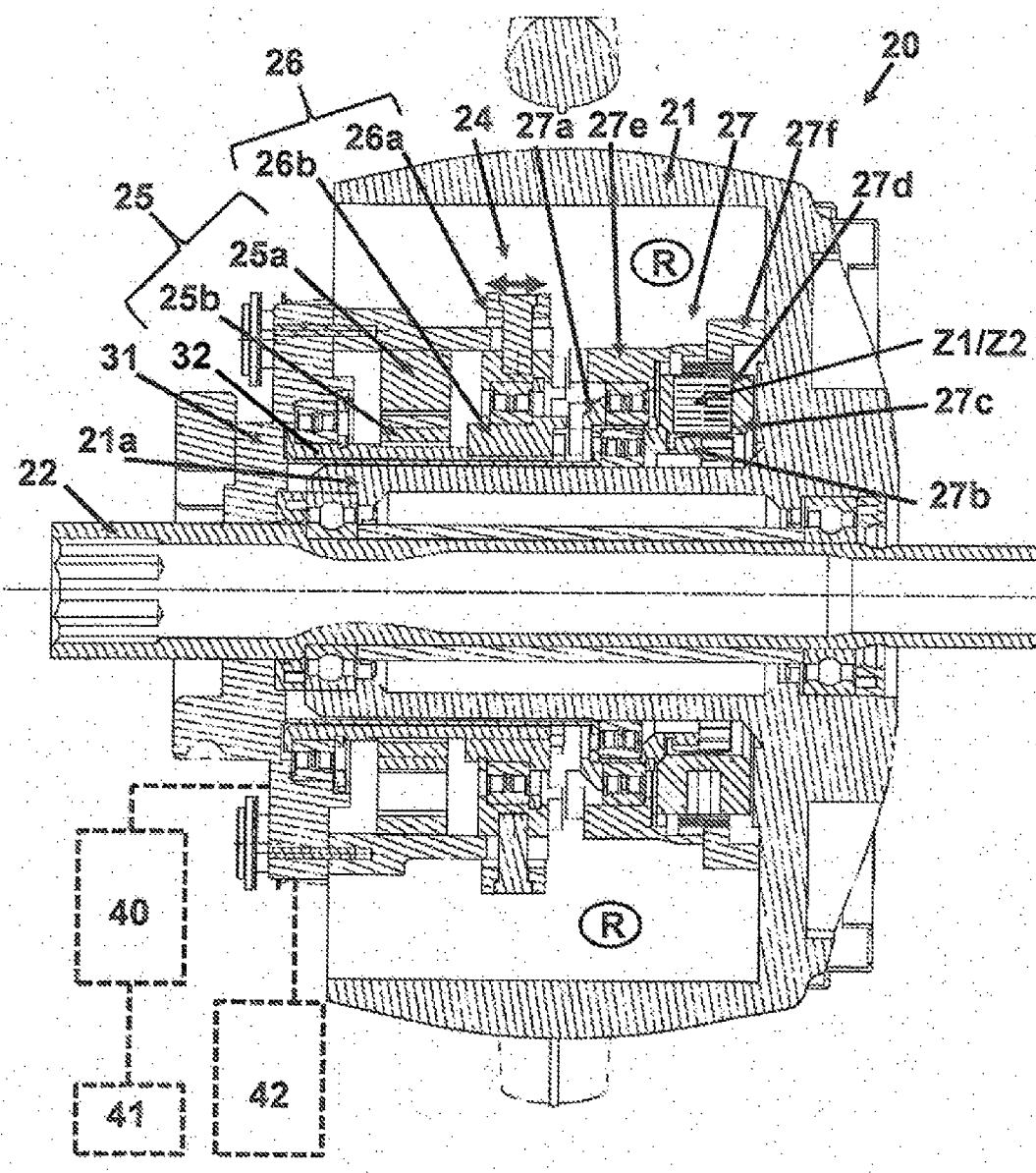
FIG. 2 is an embodiment of a first drive arrangement with a Wolfrom reduction gear for a front wheel according to the present invention.

FIG. 2 shows a concrete embodiment of a first drive arrangement 24 for a front wheel arrangement 20, where a cross sectioning plane runs in the axial direction of the wheel axle 22. The front wheel arrangement 20 comprises a front wheel 21, only partly represented, and a first drive arrangement 24 for driving this wheel, the first drive arrangement 24 being outfitted with a Wolfrom reduction gear 27.

The front wheel 21 is mounted so that it may turn about the wheel axle 22, arranged firmly on the vehicle, and it is selectively rotationally driven by an electric motor 25 of the first drive arrangement 24, the electric motor 25 being designed as a hollow-shaft motor with internal rotor. Accordingly, the electric motor 25 comprises a stator 25a, which encloses an interior rotor 25b in the circumferential direction and is joined in rotationally firm manner to the wheel axle 22 by a support element 31. On the other hand, the rotor 25b is joined in rotationally firm manner to a hollow rotor shaft 32. Together with the hollow rotor shaft 32, the rotor 25b is arranged in rotationally movable and coaxial manner on a cylindrical protrusion 21a of the front wheel 21, which in turn is arranged in rotationally movable and coaxial manner on the wheel axle 22. Thus, this arrangement allows the rotor 25b and the rotor shaft 32 to rotate with a different speed of rotation about the stationary wheel axle 22 than the front wheel 21 with its cylindrical protrusion 21a.

The rotor 25b forms the output end of the electric motor 25 and is connected by the hollow rotor shaft 32 to a coupling wheel 26b. The coupling wheel 26b is likewise connected in rotationally firm manner to the rotor shaft 32, but can move in the axial direction (see arrow) of the wheel axle 22. Consequently, the coupling wheel 26b turns together with the rotor 25b and the hollow rotor shaft 32, yet it can be connected to or separated from an input side of the reduction gear 27 by axial movement for the selective coupling to the coupling. For this, the coupling wheel 26b has one or more claw-like protrusions, which are oriented in the direction of the reduction gear 27, in order to engage there with its input side in a torque-transmitting manner.

The reduction gear 27 in the embodiment shown is designed as a so-called "Wolfrom" gear. Accordingly, the input side is defined by a sun wheel 27a, which is provided for engaging with the claws and is arranged in coaxial and rotationally firm manner with respect to the cylindrical protrusion 21a of the front wheel 21. The sun wheel 27a has an external toothing 27b on a radially outward facing surface (relative to the wheel axle 22). This external toothing 27b stands in engagement with a plurality of planet wheels 27d, which are held in a planet carrier 27c. The planet wheels 27d are each two-stage. This means that they have a first stage with a first toothing Z1 (left segment) as well as a second stage with a second toothing Z2 (right segment). The number of teeth of the first toothing Z1 is less than the toothing Z2 of the second toothing, for example, 19 teeth for the first toothing Z1 and 20 teeth for the second toothing Z2. The toothing Z1 of the first stage thus engages on the one hand with the external toothing 27b of the sun wheel 27a. In addition, the toothing Z1 of the first stage also stands in engagement with a first hollow wheel 27e surrounding the sun wheel 27a and the first stage, so that the first stage likewise rolls along the first hollow wheel 27e.

The first hollow wheel 27e in the depicted embodiment in a coupled state of the coupling is joined rotationally firmly indirectly or directly to the stator 25a. This is done, for example, by an external hollow coupling wheel 26a of the coupling 26, which wheel surrounds the coupling wheel 26b arranged on the inside in its circumferential direction, the coupling wheel 26b being mounted able to rotate with respect to the hollow coupling wheel 26a. The coupling 26 is designed such that the hollow coupling wheel 26a is moved together with the coupling wheel 26b in the axial direction (see arrow) during the coupling or decoupling of the coupling 26. The hollow coupling wheel 26a likewise has a plurality of claw-like protrusions oriented toward the reduction gear 27, which protrusions come into engagement with the first hollow wheel 27e upon coupling. Thus, the first hollow wheel 27e in the coupled state is joined in rotationally firm manner to the stator 25a indirectly via the hollow coupling wheel 26a and is thus also held in rotationally firm manner. If the coupling 26 is decoupled, the hollow coupling wheel 26a is moved away from the reduction gear 27 in the axial direction (see arrow), so that the engaging of the hollow coupling wheel 26a with the first hollow wheel 27e is broken and it is no longer held in rotationally firm manner, but rather can turn freely in this case.

The above already mentioned second stages of the planet wheels 27d each stand in engagement with a second hollow wheel 27f, which constitutes the output end of the reduction gear 27 and is joined in rotationally firm manner to the front wheel 21.

In addition, a control unit 40 may be provided, which is designed to control the first drive arrangement 24, especially the electric motor 25, and/or to actuate the coupling 26. Optionally, the control unit may be integrated in the front wheel as part of the first drive arrangement (not shown).

Furthermore, it is possible for the control unit 40 to be coupled to a BUS system 41 of the vehicle, especially a CAN bus, at least for the retrieval of information, such as information on states of the vehicle. This allows the control unit 40 to control the electric motor 25 and/or to actuate the coupling 26 in dependence on the retrieved information.

For the operation of the first drive arrangement 24 and for supplying electric energy to the electric motor 25, the first drive arrangement 24 or the electric motor 25 is coupled to a battery 42 of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   a front wheel;
   a first drive arrangement configured to drive the front wheel;
   a rear wheel; and
   a second drive arrangement configured to drive the rear wheel,
   wherein
   the first drive arrangement is integrated within a hub of the front wheel,
   the first drive arrangement includes an electric motor, a reduction gear, and an actuable coupling configured to selectively couple or decouple the electric motor with the reduction gear,
   the reduction gear is a Wolfrom gear arrangement,
   a stator and a rotor of the electric motor, the reduction gear and the actuable coupling are located axially adjacent to one another on an axle and are not radially overlapping, and
   the front wheel is drivable by the electric motor when the actuable coupling is coupling the electric motor with the reduction gear.

2. The vehicle as claimed in claim 1, wherein
   the actuable coupling is a mechanical coupling.

3. The vehicle as claimed in claim 2, wherein
   the mechanical coupling is a friction coupling or a claw coupling.

4. The vehicle as claimed in claim 1, wherein
   the stator of the electric motor is connected to a front wheel suspension in a non-rotational manner, and
   an output end of the reduction gear is connected to the front wheel such that the output end rotates with the front wheel.

5. The vehicle as claimed in claim 4, further comprising:
   a first drive arrangement control unit configured to control at least one of the electric motor and the actuable coupling.

6. The vehicle as claimed in claim 5, wherein
   the first drive arrangement control unit is integrated with the front wheel.

7. The vehicle as claimed in claim 5, wherein
   the first drive arrangement control unit is connectable to a BUS system of the vehicle to receive vehicle state information.

8. The vehicle as claimed in claim 7, wherein
   the first drive arrangement control unit is configured to control the at least one of the electric motor and the actuable coupling based on the received vehicle state information.

9. The vehicle as claimed in claim 6, wherein
   the first drive arrangement includes a mechanical securement configured to mechanically prevent an unintentional coupling of the drive motor to the reduction gear when the second drive arrangement is in an active operating state.

10. The vehicle as claimed in claim 1, wherein the first drive arrangement is coupleable to a battery of the vehicle.

11. The vehicle as claimed in claim 1, wherein the first drive arrangement is configured for slow maneuvering operation of the vehicle at a maneuvering speed between 0 and 5 km/h.

12. The vehicle as claimed in claim 1, wherein the first drive arrangement is configured for slow maneuvering operation of the vehicle at a maneuvering speed between 0 and 2 km/h.

13. The vehicle as claimed in claim 1, wherein a torque output of the electric motor is between 0.1 and 50 Nm.

14. The vehicle as claimed in claim 1, wherein a torque output of the electric motor is between 0.5 and 10 Nm.

15. The vehicle as claimed in claim 1, wherein the vehicle is a motorcycle, a scooter, a quad or a trike.

16. The vehicle as claimed in claim 1, wherein the electric motor of the first drive arrangement is a permanently excited synchronous motor, and the second drive arrangement includes at least one of an electric motor and an internal combustion engine.

17. A vehicle front wheel, comprising:
a first drive arrangement configured to drive the front wheel,
wherein
the first drive arrangement is integrated within a hub of the front wheel,
the first drive arrangement includes an electric motor, a reduction gear, and an actuable coupling configured to selectively couple or decouple the electric motor with the reduction gear,
the reduction gear is a Wolfrom gear arrangement,
a stator and a rotor of the electric motor, the reduction gear and the actuable coupling are located axially adjacent to one another on an axle shaft and are not radially overlapping, and
the front wheel is drivable by the electric motor when the actuable coupling is coupling the electric motor with the reduction gear.

* * * * *